United States Patent
Potter et al.

(10) Patent No.: US 7,293,008 B2
(45) Date of Patent: Nov. 6, 2007

(54) DATABASE REPORT GENERATION

(75) Inventors: Charles M. Potter, Nepean (CA);
Henk Cazemier, Spencerville (CA);
Glen M. Seeds, Ottawa (CA)

(73) Assignee: Cognos, Incorporated, Ottawa, Ontario (CA)

( * ) Notice: Subject to any disclaimer, the term of this patent is extended or adjusted under 35 U.S.C. 154(b) by 589 days.

(21) Appl. No.: 10/835,244

(22) Filed: Apr. 29, 2004

(65) Prior Publication Data
US 2005/0021516 A1    Jan. 27, 2005

(30) Foreign Application Priority Data
Apr. 29, 2003    (CA)    .................................. 2427185

(51) Int. Cl.
*G06F 7/00* (2006.01)
(52) U.S. Cl. .............................................. 707/1; 707/4
(58) Field of Classification Search .............. 707/1–10, 707/100
See application file for complete search history.

(56) References Cited

U.S. PATENT DOCUMENTS

| | | | |
|---|---|---|---|
| 4,454,576 A | 6/1984 | Adam et al. | 715/522 |
| 5,903,859 A | 5/1999 | McReynolds et al. | 704/8 |
| 6,003,036 A | 12/1999 | Martin | 707/102 |
| 6,411,961 B1 | 6/2002 | Chen | 707/102 |
| 6,581,068 B1 | 6/2003 | Bensoussan et al. | 707/104.1 |
| 6,658,627 B1 * | 12/2003 | Gallup et al. | 715/536 |
| 6,738,762 B1 | 5/2004 | Chen et al. | 707/3 |
| 6,847,962 B1 | 1/2005 | Cochrane et al. | 707/4 |
| 6,996,566 B1 | 2/2006 | George et al. | 707/100 |
| 6,999,977 B1 | 2/2006 | Norcott et al. | 707/203 |
| 2003/0088558 A1 | 5/2003 | Zaharioudakis et al. | 707/3 |
| 2003/0154277 A1 * | 8/2003 | Haddad et al. | 709/224 |
| 2004/0039729 A1 | 2/2004 | Boger et al. | 707/2 |
| 2004/0249810 A1 | 12/2004 | Das et al. | 707/5 |
| 2004/0268306 A1 * | 12/2004 | Cheng et al. | 717/114 |

FOREIGN PATENT DOCUMENTS

EP    0 413 486    2/1991

OTHER PUBLICATIONS

European Search Report for corresponding Application No. EP 04 01 0201, dated Nov. 18, 2004, 2 pages.

* cited by examiner

*Primary Examiner*—Wilson Lee
(74) *Attorney, Agent, or Firm*—Shumaker & Sieffert, P.A

(57) ABSTRACT

The invention provides for a method for producing reports for business intelligence that adapt automatically to a context, defined by a locale variable. A parameter map is defined, based on locale key and field names, and a report layout is produced that contains one or more macrotized database language expressions that include partial expressions built using the parameter map. Later, once a user selects a locale, the partial expression resulting from a lookup in the parameter map using the locale is used to modify one or more macrotized database language expressions. Finally, the resulting valid database language expressions are applied to the database to produce a report.

33 Claims, 3 Drawing Sheets

DATABASE REPORT GENERATION

FIELD OF THE INVENTION

The invention relates to systems and methods of data warehousing and analysis, and in particular to a system and method for producing reports in a system suitable for business intelligence applications.

BACKGROUND

Authoring reports within a global enterprise context presents some interesting challenges. Reports are authored by a relatively small number of people for a large and varied audience. Authors are specialists in their problem domain, but not necessarily in the design of large databases (sometimes known as data warehouses) and their use. Nonetheless, in producing the reports, the authors must address factors such as:
- catering to readers who speak different languages and who may be in different locales (implying differing localized expectations of how data are displayed),
- reporting against different database instances, which have different data coverage, although they have the compatible structure,
- being able to create and test reports and their underlying metadata models in a development context, and
- deploying reports to a production environment.

Although currently available reporting products address these factors they have been found inadequate. In most cases, different versions of both models and reports must be created and deployed to handle these factors. For instance a large number of versions of reports in different languages is typically required, with manual (visual) checking to ensure that the results are similar across different domains.

What is needed is the ability to produce multiple versions of reports to ensure their consistency across language and locale, or to permit user selectable variations in the grouping of data, avoiding manual mechanisms where possible. The users (report authors) should not be aware of the factors at issue in the system design. Ideally the system would produce the numerous required reports with little or no extra effort, despite the complexity and magnitude of the underlying database.

SUMMARY OF THE INVENTION

The invention introduces a mechanism involving parameterization of the database metadata elements and their models. This permits the implementation of systems capable of handling a high degree of variability, without requiring separate reports or models. It further does away with the necessity to develop a number of large, complex report or model structures, one for each system or situation.

In one aspect, the invention provides for a method of producing a business report from data contained in a computer based business intelligence system using a report authoring tool, the method comprising the steps of producing a report layout containing one or more macrotized database language expressions, defining a parameter map having at least one key and one or more field names, accepting from a user one or more parameters and storing the parameters as input parameters, modifying the one or more macrotized database language expressions in dependence upon the one or more input parameters and the parameter map to produce one or more valid database language expressions containing at least one of the one or more field names, and applying the one or more valid database language expressions to the database to produce the business report.

In another aspect the method further provides a method wherein one key of the parameter map is a locale, the selecting of the locale based on user input; and combining the locale with the parameter map to further modify the one or more macrotized database language expressions.

In yet another aspect, the method provides for the modification of the macrotized database language expression by replacement of the partial expression delineated by the special characters with a partial expression built by accessing the parameter map with a lookup function.

BRIEF DESCRIPTION OF DRAWINGS

Embodiments of the invention are described with reference to the following drawings.

DETAILED DESCRIPTION OF EMBODIMENTS OF THE INVENTION

Figure 1:
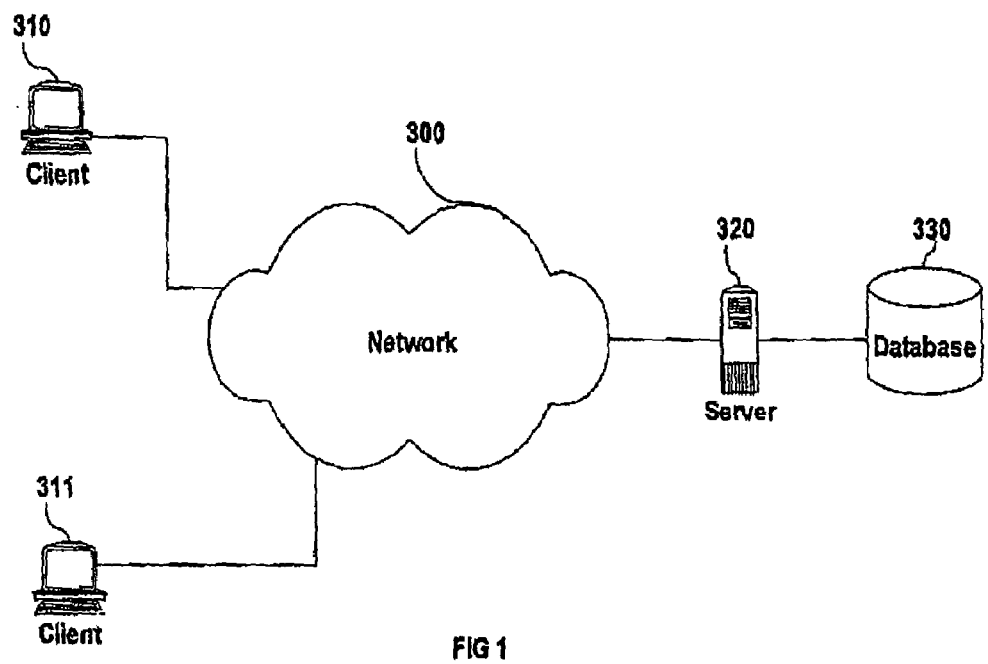
FIG. 1 shows a typical configuration in which embodiments of the invention may be deployed.

Embodiments of the invention are typically used in a general purpose client-server database system framework suitable for a business intelligence system FIG. 1 shows a typical configuration in which such embodiments may be conveniently deployed. This configuration includes a network 400 that permits clients 410, 411 to communicate with a server 420 having a database or data warehouse 430 attached. Other configurations would be suitable, including those where the client and server functions are not separate, and those where more than one database is used, and those in which the databases are remote from the server and accessed over a network. In typical systems, a query engine is used to translate the users requirements into one or more database queries to retrieve information from a business intelligence database or data warehouse, and a metadata model is used to describe the database.

Figure 2:
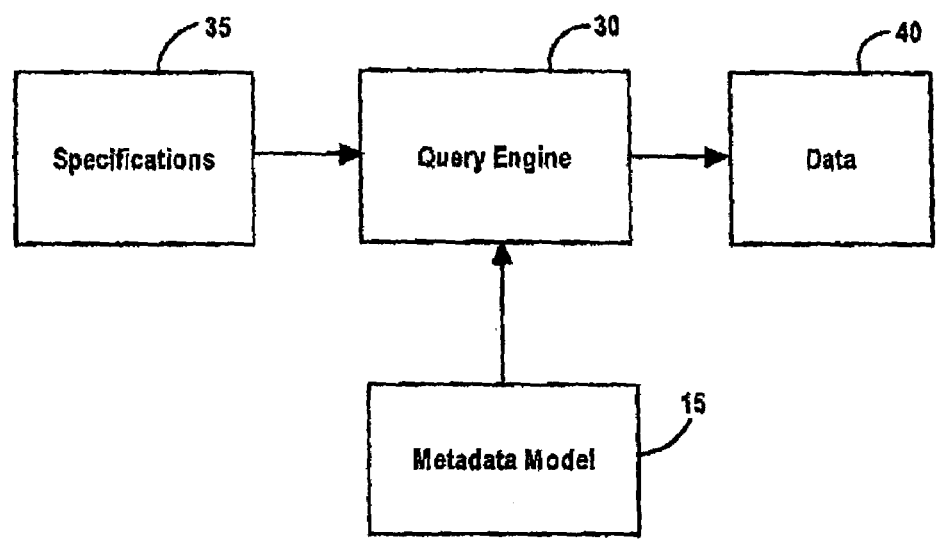
FIG. 2 is a schematic diagram showing an example of a query engine in which embodiments of the invention may be practised

The use of the metadata model 15 by the query engine 30 is briefly described with reference to FIG. 2. A user interacts with a business intelligent tool or client application (not shown) to generate a user's request for information. Upon the receipt of the user's request, the client application generates an initial specification 35 based on the request. The specification 35 may be ambiguous. Also, it may not be in a form that can be applied to the data sources directly. Using the information that is built in the metadata model 15, the query engine 30 makes the specification 35 unambiguous and builds a query in terms of the data access layer 102 for the specification 35. This intermediate formulation of the query is called a physical query and is subsequently translated into a data source specification language. The data source specification language is typically Structured Query Language (SQL), although other data source specification languages may be used. A query in a data source specification language can be executed on the data sources. Thus, the correct data 40 may be obtained. This process is explained in more detail in U.S. Pat. No. 6,609,123 "Query engine and method for querying data using metadata model"—Cazemier, et al., issued Aug. 19, 2003, hereby incorporated by reference.

Two forms of "macro" style text substitution are introduced into the database elements that are at the root of all objects in the metadata model on which all report authoring is based: session parameters, and parameter maps. These are expressed in a syntax that can be detected and acted on appropriately by the query generation engine.

In a typical example, the part of the SQL expression that describes the projection list for a database query is a parameter map lookup based on the language code selected at run time. This parameter map defines the relationship between the language codes and the columns that contain the required data for that language (for example, the name of an item in a sales catalog). At run time, the language code is mapped to the column name, which is substituted in the SQL expression. This allows a single report and model to handle many user languages, with little effort on the part of the modeller, and none on the part of the report designer.

In a second example, the model element that describes the connection to the database is a parameter map lookup based on a session variable that selects between test mode and production mode. This map defines the database connection for each mode. At rum time, the mode is mapped to the database connection information, which is used to connect to the appropriate database. This allows a single report and model to handle both test and production mode, with little effort on the part of the modeller, and none on the part of the report designer.

Embodiments of the invention require the introduction of run-time parameters in the metadata describing the underlying database. In some embodiments, prompts are introduced to allow the user to select or introduce run-time parameters. These embodiments allow the selection of database elements that are to be driven from the run-time parameters using mapping rules in the model. In this way a single model or report can handle any variability that might be determined (or defined) using run-time or user-selected parameters. The variable factors include, but are not limited to, user-selected prompt responses, report language, database instance, and test environments. The parameters are incorporated into the model (encapsulated) during the model development phase. The report authors produce report templates suitable for a variety of audiences, for example where they all have a common theme. The report authors need know nothing about run-time parameters in producing report templates.

In embodiments of the invention a number of forms of "macro" style text substitution are introduced into objects of the metadata model on which report authoring is based: in particular, session parameters, and parameter maps. These macro elements are expressed in a syntax that can be detected and acted upon appropriately by the query (generation) engine, which incorporates a macro-expanding pre-processor.

In the resultant syntax, the expressions, or rather partial expressions, to be substituted in the so-called "macrotized" SQL expressions are distinguished by special symbols bracketing the partial expressions. These symbols are carefully chosen to allow the pre-processor to unambiguously identify the partial expressions. In one embodiment, the chosen special symbols are "#". For example:

<expression_to_be_substituted>#.

Alternative special symbols may be used, providing they are compatible with the syntax of the database language. In other words, such symbols should not be part of the original database language nor should they be in its reserved symbol dictionary. In some embodiments, partial expressions may be nested, in which case it has been found convenient to introduce the inner levels of macro using one or more other special symbols. For convenience these symbols may also be required to be compatible with the database language syntax, although, with careful design of the parser within the pre-processor this may not be necessary. This nesting is also known as de-referencing and is useful in situations where a session-parameter may point to a parameter-map-entry and vice versa All embodiments of the invention given here are described in terms of SQL and relational databases using simple examples of situations where use of the invention is advantageous. However, it will be apparent to those appropriately skilled in the art that the invention is applicable to more complex environments, to databases other than relational ones, and to programming languages other than SQL.

In one example embodiment, the user is able to select a language code (say English, German, or French) at run time; that is, when an actual business report is generated. The selection of the language code allows the name of an item in a sales catalogue to be expressed in the chosen language, viz.: dishwasher, Spülmaschine or lave-vaisselle, respectively.

To achieve this result, that part of the SQL expression describing the projection list (or derived column list) for a database query results in a parameter map lookup based on a language code selected at run time. This parameter map defines the relationship between the language codes (designating for example English, Germ, or French) and the columns containing the required data for that language. Thus, the name of an item in a sales catalogue is expressed as a literal string in a particular language: "partname_en=dishwasher", "partname_de=Spülmaschine", "partname_fr=lave-vaisselle". At run time, the language code is mapped to the column name, which is then substituted in to the SQL statement before the query is run.

In this embodiment, string processing is performed on the macrotized SQL expressions using an SQL pre-processor. The resultant valid SQL expressions are then passed, via the main query engine function, to the database engine.

In this simple embodiment, the macrotized SQL expression as generated by the report author looks like this code fragment:

. . .

SELECT partno, partname#$locale# FROM Parts . . .

. . .

A table of locales provides a translation for the #$locale# string to substitute in the macrotized SQL expression to produce a valid expression.

The macrotized SQL expressions, and associated tables may be retained in a report outline for later use.

The particular entry used from this table is based on one of a number of parameters that are set for this environment/session, as described below. In this case, when the SQL pre-processor is invoked with locale="_en", the result is the following fragment of the SQL statement:

. . .

SELECT partno, partname_en FROM Parts . . .

. . .

The selection of the appropriate locale string is achieved using techniques such as indexing into the table of locales, the index value being that appropriate to the language chosen for the session, although other equivalent mechanisms may be used. In this way, other languages may be selected during execution of a report depending on the user's locale without the user being involved in manipulating the syntax of the database access language. However, this particular embodiment requires that each of the column den by partname#$locale# be constructed with a strict syntax, which provides scope for error.

Figure 3:
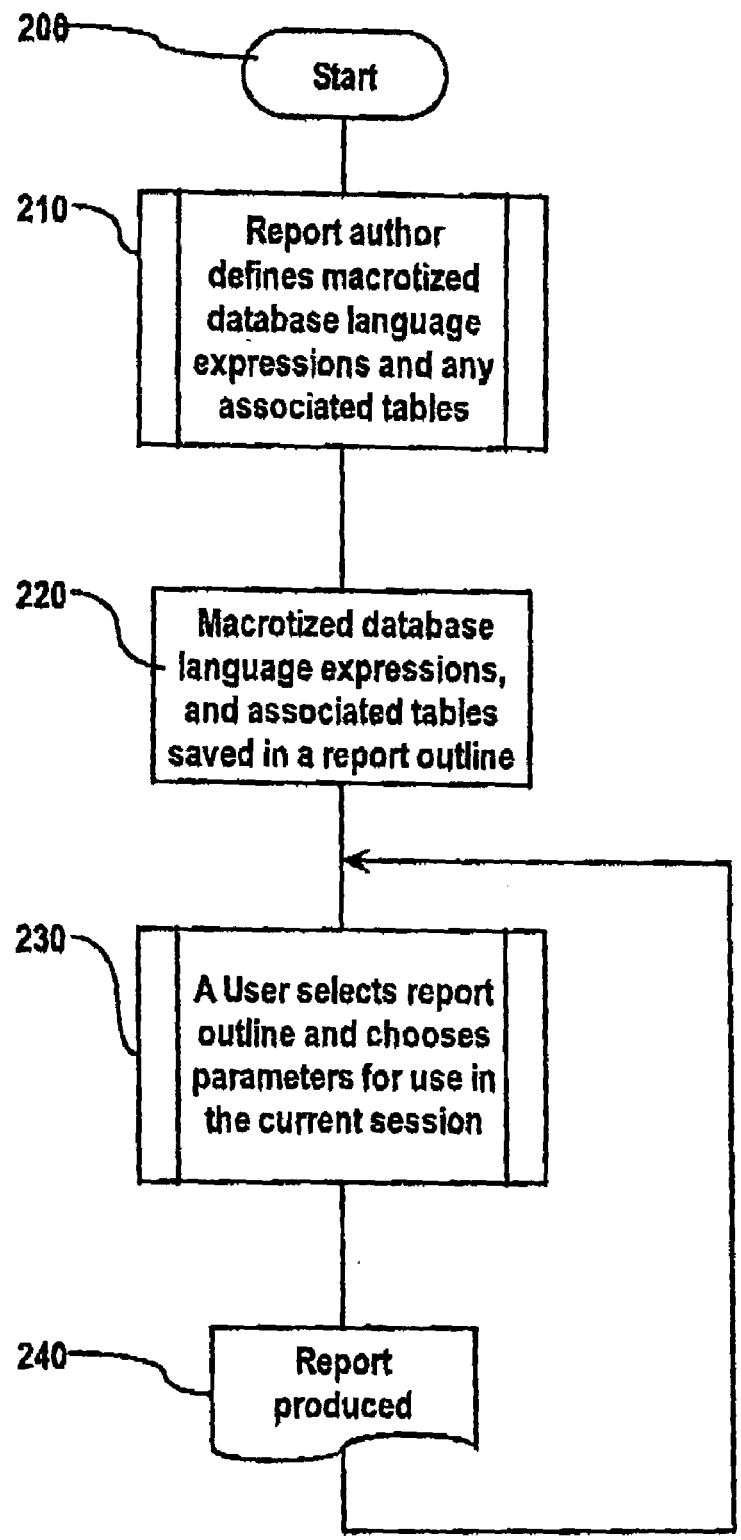
FIG. 3 is a flowchart of one embodiment of the invention

The flowchart of FIG. 3 is next described. It generally describes embodiments of the invention. Each embodiment starts 200 and a report author generates The necessary macrotized expressions and tables 210. These are th stored for later use 220 by a user who provides parameters 230 required to generate the valid database expressions, and a report is produced 240. A user may repeat the operations in 220 and 230 to produce more ta one report, and more than one user may use the results of the operations 210, 220 to produce customised reports.

In other embodiments, to overcome some of the restrictions of the earlier embodiment, the fragment of the macrotized SQL expression looks like:

. . .

SELECT partno, #$part_locale {$locale}# from Parts . . .

. . .

Figure 4:
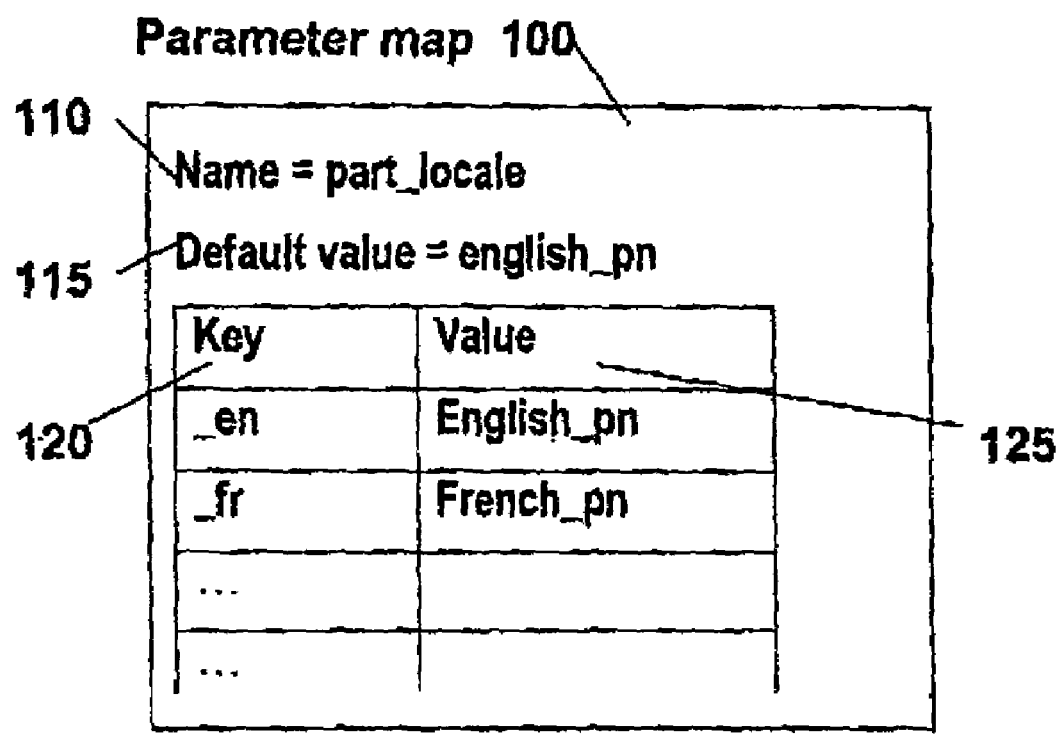
FIG. 4 shows an outline of a parameter map used in one embodiment of the invention.

Here, the table used to replace the #$part_locale {$locale}# partial expression contains the complete translation of the field name, keyed on the locale, thereby allowing more flexibility in the assignment of the field names. This is shown clearly in the FIG. 4 which shows an example of a parameter map 100, comprising a number of elements including its Name 110, and a two column table, the columns being the language Key 120, and the Value 125, in this case a reference or pointer to the part name translated into the applicable language (also referred to as a "field name"). The parameter map may also contain other information that is useful in other embodiments: in this example a Default value 115 for the reference or pointer to the translated part name. This value is selected and returned in some embodiments when the user opts not to choose a locale, or where a Key (or Value) has not (yet) been provided.

The parameter map function effectively introduces another level of 'indirection'. It has the advantage that the entire expression is defined within a single parameter map (or table). A session parameter, established for each session, is used to determine the appropriate entry (Key and Value) in the table. The resultant SQL expression is the same as the previous example:

. . .

SELECT partno, partname_en FROM Parts . . .

. . .

In all embodiments, the table or tables determined by the partial expression between the special symbols, e.g. #$part_locale {$locale} #, must contain syntactically correct partial expressions and field names for substitution into the SQL statements as required.

The above example embodiment of The invention allows a single report and model to handle many user languages.

In a further embodiment, the model element that describes the connection to the database is formed from a parameter map lookup based on a session variable that selects between test mode and production mode. This map defines the database connection for each mode. At run time, the mode is mapped to the database connection information, which is used to connect to the appropriate database.

For example the fragment of the macrotized SQL expression is:

. . .

SELECT partno, partname_en from #$part_source#

. . .

where $part_source is a session parameter that should contain the name of a table, which is then substituted during pre-processing. In these embodiments it is required that all of the alternative databases contained in the sources table be compatible.

In this example the method described allows report authors to produce a single report and model to handle both the test and production models. Subsequently, no effort is required on the part of the report users who rely on their locale to insulate them from the underlying substitutions and conversions.

In the following embodiment of the invention the user is prompted to supply more information that can be ascertained from the data already available.

The first code snippet is the definition of an element requiring user input.

gcol defined as:

```

$group_col{
prompt('gcolumn','token','1')
}

At run time, this results in the following snippet of code.
Here the user must provide at least
some of the information required.
report on
gcol ----> user prompted
product.productname
details.quanitity
    group_col -->default: [qegosales].[PRODUCT].[PRODUCTNAME]
1 --> [qegosales].[COUNTRY].[COUNTRY]
2 -->[qegosales].[PRODUCTLINE].[PRODUCTLINE]
```

In further embodiments, the system provides default input if the user chooses not to provide any.

For convenience, the following sections describe some more interesting aspects of a Macro syntax used in one embodiment of the macro specification. In practice, many variations are possible. The macros are used to create runtime driven fragments of query code and provide a means to manipulate strings and string expressions.

Session Parameters (or Model Parameters)

$parameter_name Evaluates to the value of the specified session parameter or, if it is not defined, to an empty string.

Examples: $runLocale $account.defaultName

Parameter Map Entries $map{<key expr>} Evaluates to a value from a list of entries of the specified map at the specified key, which may be specified using a macro string expression.

Example: $languages{'en-us'}

$languages{$runLocale}

These fragments rely on the existence of a table like the following:

| languages | |
|---|---|
| Key | Value |
| en-us | English |
| fr | French |

In the second fragment, the parameter used is an assumed global variable, $runLocale, previously initialised appropriately.

Parameter Map

% map Evaluates to a reference to the specified map, not just a single entry.

Example: csvIdentityName (% mapRolesToKeys)

This provides all roles of the current user as a comma-separated list.

It makes reference to a table, like the following:

| mapRoles to Keys | |
|---|---|
| Key | Value |
| NA | NorthAmerica |
| EU | Europe |
| . | . |
| . | . |
| . | . |

Complex Functions

C$VIdentityName returns a comma separated values list of the identity information remapped through the specified table.

syntax: C$VIdentityName (% map[, separator])

example: regionColumn in (#CSVIdentityName ( % region_for_identity,",")#)

In use this might result in:

regionColumn in ('North America', 'Europe')

application: to build partial in-clauses, to filter data based on the identity name of the current user.

Integration

The Macros defined in embodiments of the invention provide partial expressions that can be used directly within database languages expressions, or within related Filters and Calculations.

Some functions take in a whole parameter map as an argument. This is expressed using the '%' character instead of the '$' character to precede the nine of the map For example.

```
#in__clause__builder (
    "'",       // start quote for each element
    "'",       // end quote for each element
    " , ",     // separator between elements
    %mymap)    // the map to get the entries from

```

As with many macro languages, additional control structures such as if-then-else, for-loop and do-while-loop, can be added, as well as array structures, Users (designers) are able to define and provide additional functions, which can also be extended to be more than a single statement.

What is claimed is:

1. A method of producing a business report from data contained in a computer based business intelligence system having a report authoring tool, the method comprising the steps of:

producing a report layout containing one or more macrotized database language expressions;

defining a parameter map having one or more keys and one or more field names, the one or more keys being associated with the one or more field names;

accepting from a user one or more user inputs;

modifying the one or more macrotized database language expressions, including:

producing, from the one or more macrotized database language expressions in dependence upon the one or more user inputs and the parameter maps, one or more valid database language expressions for a database query, the one or more valid database language expressions containing at least one of the one or more field names; and applying the one or more valid database language expressions to one or more databases, including:

retrieving the data from the one or more databases based on the one or more valid database language expressions to produce the business report.

2. The method of claim 1 wherein at least one of the one or more keys is a locale.

3. The method of claim 2 wherein the step of producing one or more valid database language expressions for a database query includes:

selecting the locale based on the user input; and combining the locale with the parameter map to further modify the one or more macrotized database language expressions.

4. The method of claim 1 wherein the one or more valid database language expressions form Structured Query Language.

5. The method of claim 3 wherein the step of selecting the locale includes:

providing a default locale.

6. The method of claim 1 wherein the step of producing one or more valid database language expressions for a database query includes:

substituting a partial expression delineated by one or more predetermined characters within the macrotized database language expressions.

7. The method of claim 1 wherein the step of producing one or more valid database language expressions for a database query includes:

replacing a partial expression delineated by one or more predetermined characters with a partial expression built by accessing the parameter map with a lookup function.

8. The method of claim 7 wherein the key is locale, and wherein the step of accessing the parameter map includes:

indexing with the locale.

9. The method of claim 8 wherein the step of indexing with the locale includes:

selecting at least one of the one or more field names appropriate to the locale.

10. The method of claim 8 wherein the step of indexing with the locale includes:

selectiug at least one of the one or more field names in the language of the locale.

11. The method of claim 1 wherein the one or more databases comprises a data warehouse.

12. A computer based system for the production of a business report from data contained in a computer based business intelligence system having a report authoring tool, including:
- means for producing a report layout containing one or more macrotized database language expressions;
- means for defining a parameter map having one or more keys and one or more field names, the one or more keys being associated with the one or more field names;
- means for accepting from a user one or more user inputs;
- means for modifying the one or more macrotized database language expressions, including:
  - means for producing, from the one or more macrotized database language expressions in dependence upon the one or more user inputs and the parameter map, one or more valid database language expressions for a database query, the one or more valid database language expressions containing at least one of the one or more field names; and
  - means for applying the one or more valid database language expressions to one or more databases, including:
    - means for retrieving the data from the one or more databases based on the one or more valid database language expressions to produce the business report.

13. The system of claim 12 wherein at least one of the one or more keys is a locale.

14. The system of claim 13 wherein the means for producing one or more valid database language expressions for a database query includes:
- means for selecting the locale based on the user input; and
- means for combining the locale with the parameter map to further modify the one or more macrotized database language expressions.

15. The system of claim 12 wherein the one or more valid database language expressions form Structured Query Language.

16. The system of claim 14 wherein the means for selecting the locale includes:
- providing a default locale.

17. The system of claim 12 wherein the means for producing one or more valid database language expressions for a database query includes:
- means for substituting a partial expression delineated by one or more predetermined characters within the macrotized database language expressions.

18. The system of claim 12 wherein the means for producing one or more valid database language expressions for a database query includes:
- means for replacing a partial expression delineated by one or more predetermined characters with a partial expression built by accessing the parameter map with a lookup function.

19. The system of claim 18 wherein the key is locale, and wherein the means for accessing the parameter map includes:
- means for indexing the locale.

20. The system of claim 19 wherein the means for indexing with the locale includes:
- means for selecting at least one of the one or more field names appropriate to the locale.

21. The system of claim 19 wherein the means for indexing with the locale includes:
- means for selecting at least one of the one or more field names in the language of the locale.

22. The system of claim 12 wherein the one or more databases comprises a data warehouse.

23. A computer-readable medium having computer-executable instructions thereon for performing a method for producing a business report from data contained in one or more database, comprising;
- code for producing a report layout containing one or more macrotized database language expressions;
- code for defining a parameter map having one or more keys and one or more filed names, the one or more keys being associated with the one of the one or more field names;
- code for accepting from a user one or more user inputs;
- code for modifying the one or more macrotized database language expressions, including:
  - producing, from the one or more macrotized database language expressions in dependence upon the one or more user inputs and the parameter map, one or more valid database language expressions for a database query, the one or more valid database language expressions containing at least one of the one of the one or more field names; and
  - code for applying the one or more valid database language expressions to one or more databases, including:
    - code for retrieving the data from the one or more databases based on the one or more valid database language expressions to produce the business report.

24. The method of claim 1 wherein at least one of the one or more keys is a mode variable having values selected from the group consisting of test and production.

25. A method of producing a business report from data contained in a computer based business intelligence system, the method comprising the steps of:
- producing a report layout containing one or more macrotized database language expressions;
- defining a parameter map having at least one key and at least one field name associated with the at least one key;
- accepting from a user one or more user inputs;
- modifying the one or more macrotized database language expressions in dependence upon the one or more user inputs and the parameter map, including
  - accessing the parameter map based on the user input, and
  - replacing a partial expression delineated by one or more predetermined characters with a partial expression based on the result of the access to the parameter map to produce one or more valid database language expressions for a database query;
- applying the one or more valid database language expressions to one or more databases to produce the business report.

26. The method of claim 25 wherein the one or more valid database language expressions are defined by database query language.

27. The method of claim 25 wherein the step of accessing comprises:
- accessing the parameter map based on the user input with a lookup function.

28. The method of claim 25 wherein at least one of the one or more keys is a locale, the step of accessing comprising:
- selecting the locale based on the user input.

29. The method of claim 25 wherein at least one of the one or more keys is a locale, the step of accessing comprising:
- indexing with the locale.

30. The method of claim 29 wherein the parameter map comprises one or more field names associated with the one or more keys, and wherein the step of accessing comprises:

selecting a field name appropriate to the locale from the parameter map.

31. The method of claim 29 wherein the parameter map comprises one or more field names associated with the one or more keys, and wherein the step of accessing comprises:
selecting a field name in the language of the locale from the parameter map.

32. The method of claim 26 wherein the one or more valid database expressions form Structured Query Language.

33. The method of claim 28 wherein the step of selecting the locale comprises:
providing a default locale.

* * * * *